United States Patent
Harkness et al.

(10) Patent No.: US 8,756,050 B1
(45) Date of Patent: Jun. 17, 2014

(54) TECHNIQUES FOR TRANSLATING CONTENT

(75) Inventors: Roy N. Harkness, Sammamish, WA (US); Bryan K. Beatty, Issaquah, WA (US); Michael G. Curtis, Sammamish, WA (US); Alexander Slutsker, Seattle, WA (US); Kelly L. Duggar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 787 days.

(21) Appl. No.: 12/881,605

(22) Filed: Sep. 14, 2010

(51) Int. Cl.
*G06F 17/28* (2006.01)

(52) U.S. Cl.
USPC ............. 704/2; 704/3; 704/4; 704/5; 704/7; 704/8; 704/1; 704/9; 707/706; 707/707; 707/708; 715/264

(58) Field of Classification Search
USPC ............. 704/1–10; 707/706–708; 715/264
See application file for complete search history.

(56) References Cited

U.S. PATENT DOCUMENTS

| | | | |
|---|---|---|---|
| 7,653,531 B2 * | 1/2010 | Sneddon et al. | 704/10 |
| 2006/0136824 A1 * | 6/2006 | Lin | 715/531 |
| 2007/0050182 A1 * | 3/2007 | Sneddon et al. | 704/2 |
| 2009/0157386 A1 * | 6/2009 | Zhou | 704/9 |
| 2009/0193003 A1 * | 7/2009 | Heymans et al. | 707/3 |
| 2009/0198487 A1 * | 8/2009 | Wong et al. | 704/4 |
| 2011/0184722 A1 * | 7/2011 | Sneddon et al. | 704/7 |
| 2011/0307495 A1 * | 12/2011 | Shoshan | 707/748 |
| 2011/0311145 A1 * | 12/2011 | Bern et al. | 382/195 |
| 2011/0313762 A1 * | 12/2011 | Ben-David et al. | 704/231 |

* cited by examiner

*Primary Examiner* — Lamont Spooner
(74) *Attorney, Agent, or Firm* — Kilpatrick Townsend & Stockton LLP

(57) ABSTRACT

Techniques, including systems and methods, for providing translated content are described and suggested herein. In an embodiment, translations for instances of content are received and reviewers provide votes regarding the translations' quality. Votes received for translations are utilized in order to determine scores for the translations. Reviewers and translators may be scored as well. Scores for translations are used in various processes for providing appropriate content to users.

24 Claims, 9 Drawing Sheets

TECHNIQUES FOR TRANSLATING CONTENT

BACKGROUND

While current communications networks provide the ability to easily communicate to people all over the world, the content of a communication is only effective when it is provided in a language that is understandable to those involved in the communication. A website providing content in English, for instance, may not be very useful to a non-English speaking person. Generally in such situations, content in one language often must be translated to another language to be effective. An entity wishing to expand operations of an electronic commerce website into another country, for example, may need to translate all or at least a portion of the website into the country's local language. Similarly, an entity wishing to provide services to populations who do not communicate well in a primary language of a geographic area must translate much of the content that it distributes, whether electronically or otherwise. Complicating this issue is the fact that content is often generated at a high rate, especially when content providers give users the opportunity to provide their own content.

Partly due to the need to translate content and the amount of content to be translated, automated translation tools have developed. However, because of the complexity of language, cultural differences in how people express themselves, various incongruent grammatical structures, and other factors, the quality of content translated by these automated translation tools is not optimal. The meaning of a word, for instance, may change dramatically based on the context in which the word is used. The word "flash," for example can refer to a burst of radiant energy, an illumination device of a camera, a brief moment in time, a type of computer memory, or other things depending on how the word is used. In another language, a single word may not have the same multiple meanings. Automated translation tools have had limited success ascertaining the correct meaning of a word when translating. Thus, automated translation tools often provide content that is difficult to understand or simply not elegantly composed. While manual translation by a qualified translator may address these issues, manual translation is often time consuming and prohibitively expensive for many uses when translation would be beneficial.

DETAILED DESCRIPTION

Figure 1:
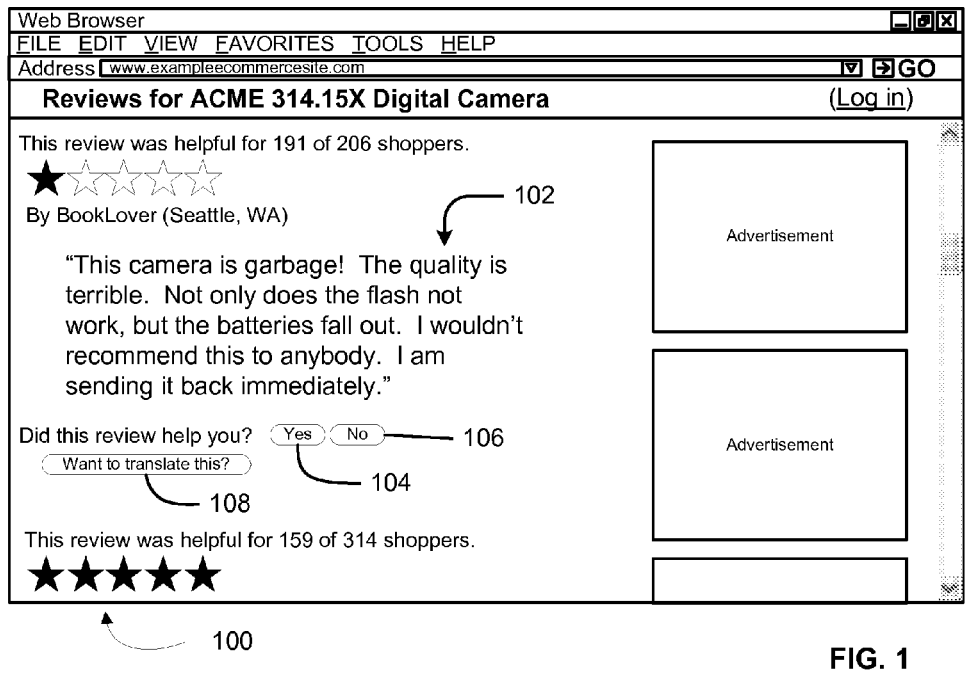
FIG. 1 shows an illustrative example of a Web page which may be produced in accordance with an embodiment.

Techniques, including systems and methods, for translating content are described and suggested herein. In an embodiment, various instances of content are provided to users. Examples of content instances include documents, portions of text, audio files, video files, and, generally, any collection of information that encodes information expressed in a language.

Providing content instances to users may be performed in various ways, including, in an embodiment, sending content instances to users over a communications network for display or other presentation on user devices. Content instances, for example, may be encoded as part of web pages. In an embodiment, at least some users are provided an opportunity to translate content instances. As an example, some or all users may be provided content with a selectable interface element that can be selected in order to allow the users to submit translations of the content. The submitted translations may be stored and used to provide translations of the content to other users.

In an embodiment, submitted translations are rated by one or more reviewers. Reviewers may be people to whom translated content is provided on a web page. Reviewers may submit electronic votes (a type of review) to express opinions about the quality of a particular translation. Reviewers may also be provided an opportunity to submit their own translations and/or to correct translations that the reviewers believe are mistranslations. Votes received for translations may be used to rate the translations. For example, if reviewers of a translation generally agree that the translation is a good translation, then the translation may be rated high or, generally favorably, such as by having nine out of ten stars, or some other measure of the translation's quality. If reviewers generally agree that a translation is a poor translation, then the translation may be rated low, or generally unfavorably such as by being given a lower score or having a higher percentage of unfavorable ratings. A translation's rating may be encoded in a translation score, which may be a numerical or other value that indicates the translation's quality, as determined by reviewers that have submitted votes for the translation. A translation's rating may be used to determine whether to provide the translation to users and/or to determine in which contexts to provide the translations. For instance, if a user navigates to a web page about a particular item (e.g., product or service) offered for consumption (e.g., purchase, rent, lease, or download), if translated information related to the item is available in a language that the user understands and the translated information is rated high or favorably enough, then the translated information may be provided to the user. The information related to the item may be, for instance, a user-generated review of the item submitted in a language other than a language that the user understands.

Reviewers and translators may also be rated, in accordance with various embodiments. Reviewers, for example, may be rated based at least in part on statistics regarding how their reviews agree with those submitted by other reviewers. The quality of a reviewer, based at least in part on how the reviewer's reviews agree with other reviewers, may be encoded in a reviewer score, which may be a numerical or other value that indicates the quality of the reviewer. If others generally agree with a reviewer about the quality of one or more translations, then the reviewer may be rated high. If others generally disagree with a reviewer about the quality of one or more translations, then the reviewer may be rated low. Translators that have provided translations of content may be rated based at least in part on statistics regarding how their translations have been rated. The quality of a translator, based at least in part on ratings of the translator's translations, may be encoded in a translator score, which may be a numerical or other value that indicates the quality of the translator.

Reviewer scores, translator scores, and translation scores may be used in calculations of each other. As an example, a translation score of a piece of content (or portion of content) may be based at least in part on the reviews of the translation by others. Reviews of the translation that are associated with high-score reviewers may be more heavily weighted than translation scores submitted by lower scoring reviewers. In this manner, a translator's translator score may depend at least in part on scores of reviewers that have reviewed the translator's translations. As another example, a person's reviewer score may be affected by their agreement with reviews submitted by high-score reviewers (e.g., increases reviewer score) as opposed to reviews submitted by lower scoring reviewers (e.g., lowers reviewer score).

Translations provided according to various embodiments described and suggested herein may be provided as a service to entities in need of translations. Entities may, for instance, request translations by calling a web service operable to provide translations. An entity may submit content and one or more languages into which a translation of the content is desired. The submitted content may be provided by users according to the various embodiments described and suggested herein. Translations may be then provided to the requestor.

FIG. 1 shows an illustrative example of a Web page 100 that includes content in accordance with an embodiment. In this particular example, the Web page 100 is a Web page for providing user reviews of a particular consumer product. For instance, as shown, the Web page 100 includes a review 102 which was generated (composed) and submitted by a user. Proximate to the review in this example are various interface elements that allow users viewing the review 102 to provide input about the review 102. For instance, the Web page 100 includes a yes button 104 and a no button 106 that allow the user to provide input regarding whether the user found the review 102 helpful. If, for example, the user viewing the review 102 found the review 102 helpful, then the user may select the yes button 104 and a device on which the Web page 100 is displayed may send a message indicating the user selection of the yes button 104 for recording. Similarly, the user may select a no button 106 in order to indicate that he or she did not find the review helpful. The user's device may then send an appropriate message indicating the user's selection of the no button 106.

In an embodiment, as different users select the yes button 104 or the no button 106, the users' selections are recorded and used to provide information about how users in general value the review. For instance, as shown in the Web page 100, a sentence appears saying that "This review was helpful for 191 out of 206 shoppers." Thus, in an embodiment users may have selected either the yes button 104 or the no button 106, and 191 of those users may have selected the yes button 104. In this manner, users can quickly ascertain, based at least in part on the opinions of other users, whether they want to read the review carefully in making a purchasing or other consumption decision.

In the example Web page 100, content is provided in English. The Web page 100 may, for instance, be provided as part of the electronic commerce website that offers items for consumption to users in an English speaking country, such as the United States, Canada or the United Kingdom or, generally, that offers items for consumption to a target set of users that are able to understand English. Items for consumption may include consumer products, services, electronic content such as audio files, video files, electronic books, and electronic documents, access rights to content, and, generally, any items that may be consumed. An entity operating the website 100 or another entity may wish to provide reviews to users (or other content) in languages other than English. For instance, an entity that operates the website of which the Web page 100 is a part may wish to make it easier for users that do not read English (or at least not well) to browse the Web page 100. Accordingly, the Web page 100 includes a selectable translation button 108 to provide a translation of the review. An example of a Web page to which the user may navigate in order to translate the review 102 is provided in FIG. 5, which will be discussed in more detail below.

The translation button 108 may be provided to all users to whom the review 102 is provided for display. Alternatively, the translation button 108 may be selectively or otherwise provided to users. For instance, the translation button 108 may be provided only to users identified in a data store as being able to communicate in a language other than English or perhaps only to users identified in the data store as having the ability to communicate in a particular language in which a translation of the review 102 is desired. In this last example, for instance, if the review 102 is not needed in Spanish, but is needed in Russian, the translation button 108 may be presented to users that are identified in the data store as being able to communicate in Russian. Generally, any suitable way of selectively providing the translation button 108 may be used, and the manner in which the translation button 108 is provided may vary depending on the context in which translations are needed.

Figure 2:
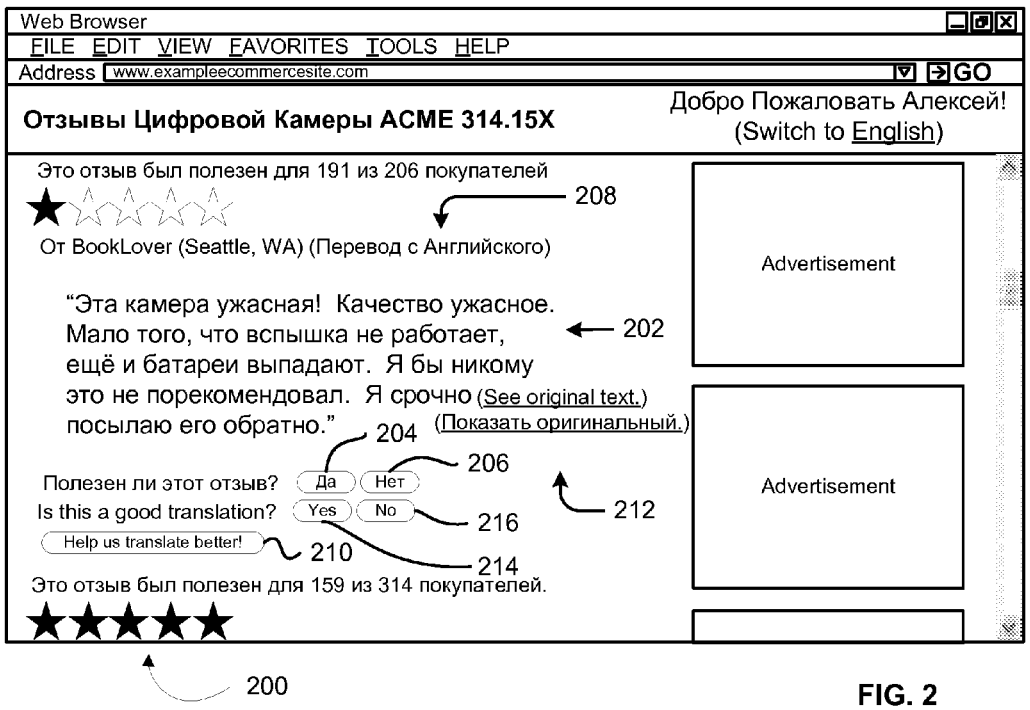
FIG. 2 shows an illustrative example of a Web page on which contents from the Web page shown in FIG. 1 has been translated in accordance with the embodiment.

As noted, translations submitted by users using the translation button 108 or otherwise provided may be used to provide corresponding content in another language. Accordingly, FIG. 2 shows an illustrative example of a Web page 200 which includes content of the page 100 discussed above in connection with FIG. 1 that has been translated. In this particular instance, some of the content of the Web page 100 shown on FIG. 1 has been translated into Russian for the Web page 200 shown in FIG. 2. For example, the Web page 200 includes a review 202 which, in this example, is a Russian translation of the review 102 shown in FIG. 1. The review 202 in FIG. 2 may have been translated by an automated translation tool and/or by one or more users. In Web page 200, a yes button 204 and a no button 206 are provided to the user and which may operate similarly to the yes button 104 and the no button 106 described above in connection with FIG. 1. Text appearing on the yes button 204 and no button 206 in FIG. 2, however, in this example, are translated to Russian for the benefit of a user to whom the Web page is displayed.

In the Web page 200, an indication 208 is provided to the user in order to inform the user that the review 202 was originally submitted in another language. In this particular instance, the indication 208 is a phrase in Russian informing the user that the review 202 is a translation of a review originally submitted in English. Also provided in the Web page 200, in this example embodiment, is a translation improvement button 210 which is selectable by the user to correct any portion of the translation or otherwise provide his or her own translation. While the translation improvement button 210 is shown with English text, the text may be in Russian, as may other portions of the web page 200 and/or an application used to display the web page 200. Selection improvement button 210 may allow the user to navigate to the Web page shown in FIG. 5, or a page having similar features. The Web page shown in FIG. 5, and features shown thereon, is described in more detail below. In an embodiment, a user is allowed to change a translation, although one or more processes for authorizing changes to translations may be used. For instance, users may be provided an option to vote on one or more changes of a translation and a determination whether the change may be made based at least in part on votes received. In this manner, incorrect translations may be avoided.

Also shown in the example embodiment of FIG. 2 is a portion of the original content viewing element 212 that is selectable by a user in order to view the translated content in its original language. In this example, the original content viewing element 212 is presented as text with an embedded command that, upon selection of the text, causes the content to be displayed in the language it was originally submitted in. The command may be a hyperlink to a page containing the original content, a JavaScript® command that causes the original content to be displayed, or, generally, any mechanism that can be used to cause the original content to be provided to the user. The original content viewing element 212, or other elements, may include other options, such as the ability to view the content in a language other than the original language, such as a language to which the original content was also translated.

In some instances, users who may not understand another language well enough to provide a translation may nevertheless recognize that a translation is a poor translation. For instance, if a word is spelled wrong, grammar is incorrect and/or if spelling and grammar are correct, but nonstandard phrasing is used, the user may recognize that translation is poor. Similarly, if the review is simply difficult to understand, the user may recognize that the translation is poor. For example, a person who understands only Russian may recognize that a translation is poor based solely on the translation itself, without any substantial knowledge of the language from which the translation was made. Of course, users who do understand other languages may also recognize the translation is poor. Accordingly, in an embodiment, the Web page 200 includes a yes button 214 and a no button 216 that in this case allows the user to whom the Web page 200 is displayed to indicate whether or not the user thinks that the translation is good. For instance, if the user thinks that the translation is good, he or she may select the yes button 214 and information regarding the user selection of the yes button 214 may be responsibly communicated to an appropriate server. Similarly, the user may select the no button 216 to indicate that he or she thinks that the translation is poor and information corresponding to the user's selection would be transmitted appropriately. As will be described below, information regarding whether or not users think the translation is good or bad is collected and used in various ways.

Figure 3:
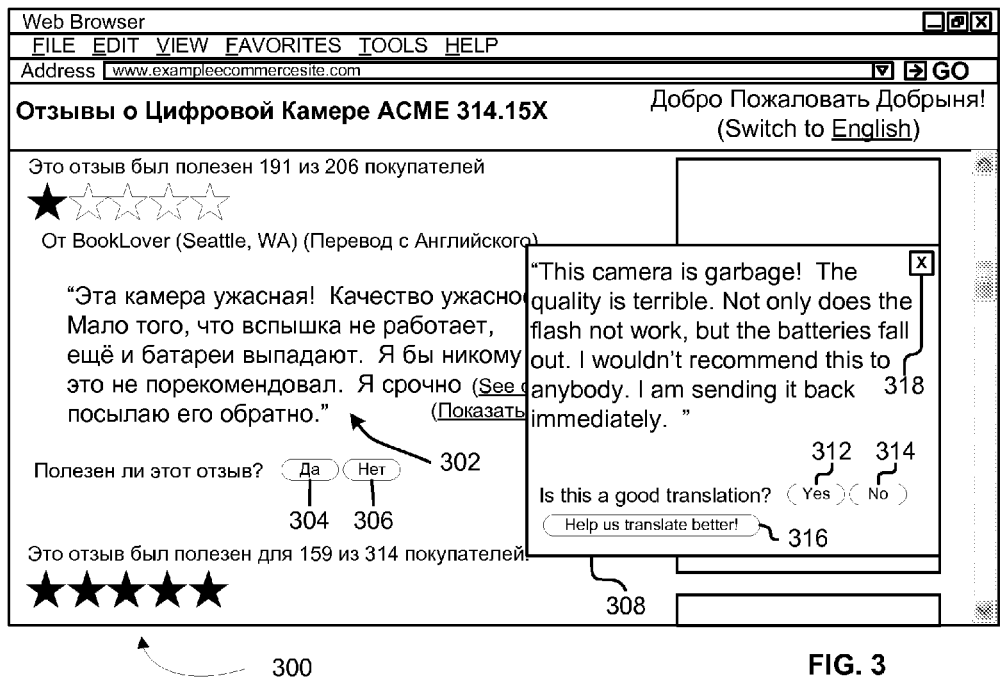
FIG. 3 shows an illustrative example of the Web page which includes translated content of the Web page shown in FIG. 1 in accordance with another embodiment.

As noted, the embodiment shown in FIG. 2 is provided for the purpose of illustration and variations are contemplated as being within the scope of the present disclosure. Accordingly, FIG. 3 shows an illustrative example of such a variation that may be used in accordance with an embodiment. In particular, FIG. 3 shows a Web page 300 in which content from the Web page shown in FIG. 1 has been translated. The Web page 300 may be provided as an alternative to the Web page 200 shown in FIG. 2. In this example, the Web page 300 is in many aspects similar to the Web page 200 shown in FIG. 2. For example, the Web page 300 includes a review 302 which is a translation of the review 102 discussed above in connection with FIG. 1. Returning to FIG. 3, the Web page 300 also includes a yes button 304 and a no button 306 translated into Russian to allow the user to whom the Web page 300 is displayed to indicate whether or not he or she finds that review 302 is helpful. The Web page 300 in this instance also includes a pop-up box 308 which may appear superimposed on the Web page 300 subsequent to user input indicative of user intent to view the original text from which the review 302 was translated. The user input may be, for example, selection of the phrase "See original text." For instance, the pop-up box 308 may appear superimposed on the Web page 300 subsequent to the user selection of the phrase "see original text." The pop-up 308 in the embodiment includes the original review 310 which, in this example, is the review 102 discussed above in connection with FIG. 1.

In FIG. 3, the pop-up 308 in this example includes a yes button 312 and a no button 314, which may operate similarly to the yes button 214 and the no button 216 discussed above in connection with FIG. 2. Thus, the user may select either the yes button 312 or the no button 314 in order to indicate whether or not the user thinks the translation 302 is a good translation of the original translation 310 shown on the pop-up box 308. Because, in this example, the yes button 312 and no button 314 are in the pop-up box 308, the user is only provided the ability to indicate whether or not he or she thinks that translation of the original review 310 to the review 302 is good when the user can view the original review 310 in English with the translated review 302. Therefore, it is ensured that the user is able to compare the text of both the original review 310 and the translated review 302 when selecting either the yes button 214 or no button 216. However, variations are possible, including providing a yes button and a no button both directly on the web page 300 and in the pop-up box 308. The Web page 300 and the pop-up box 308 also, in this example, include a translation improvement button 316 which may operate similar to the translation improvement button 210 described above in connection with FIG. 2.

Figure 4:
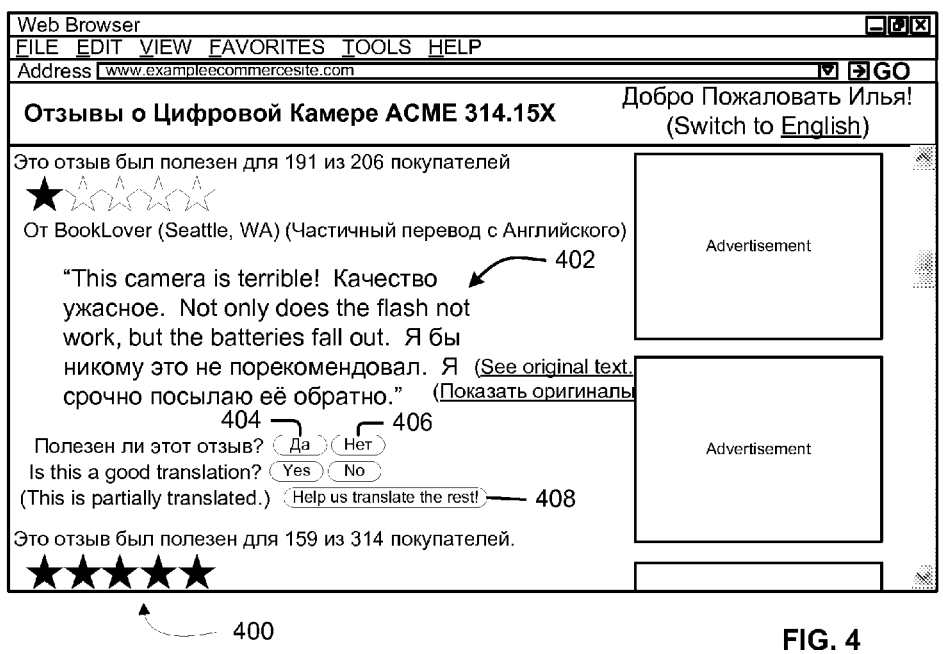
FIG. 4 shows another illustrative example of a Web page, including content translated from the content shown in FIG. 1 in accordance with an embodiment.

FIG. 4 shows an illustrative example of another variation that may be provided to users, in accordance with an embodiment. In FIG. 4, another Web page 400 is shown. The web page 400 may be similar in several aspects to the Web page 200 discussed above in connection with FIG. 2. For example, as shown in the figure, the Web page 400 includes a review 402, a yes button 404 and a no button 406 that allow the user to indicate, as discussed above, whether or not the user thinks the review is helpful. In this example, however, only a portion of the review 402 appears as a translation of the review 102 discussed above in connection with FIG. 1. For instance, the first sentence of the review 402 is shown in the language of the originally submitted review (English), while the second sentence of the review 402 is shown translated into Russian. Similarly, the third sentence of the review 402 is shown in English and the fourth and fifth sentences of the review 402 are shown in Russian. There can be various reasons why the review 402 is shown in two different languages.

For example, previously submitted reviews containing the phrase "the quality is terrible" in English may have already been translated into Russian (by the system or other reviewers). If one or more of these Russian translations of the phrase "the quality is terrible" is consistent and/or if the Russian translation is highly rated (where ratings of reviews are discussed more below), then the prior Russian translation(s) of the phrase "the quality is terrible" may have be stored in a data store. Thus, when another review is submitted in English with the phrase "the quality is terrible" a reliable Russian translation of the phrase is readily available. Translations of some portions of content may be provided based at least in part on translation consistency among users, whereas other portions of continuity may be provided based at least in part on content having been translated by one or more highly rated translators. Generally, many different ways of translating portions of content may be combined together to form content. Thus, for instance, translations of different sentences of the review 402 may have been provided in different ways and the translations of the different sentences may be combined to form a larger piece of content. Further, instead of leaving content in the original language, an automated translation tool may be used for content for which a reliable translation is not available.

Figure 5:
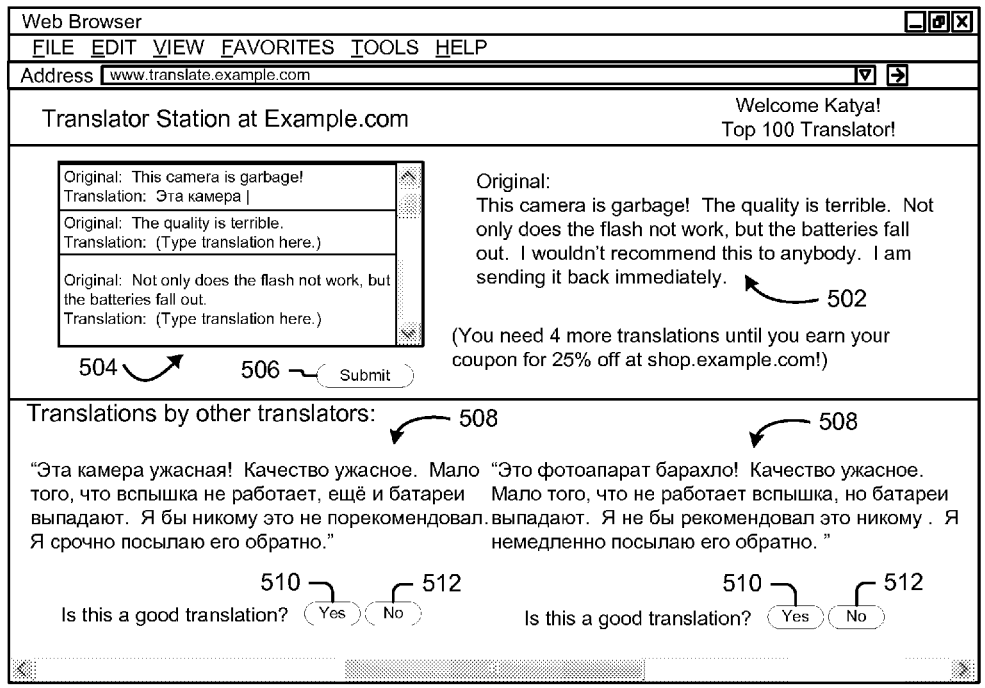
FIG. 5 shows an illustrative example of a Web page which may be used to allow for users to provide translations in accordance with an embodiment.

As noted, in various embodiments, users are provided an opportunity to submit translations of content. Accordingly, FIG. 5 shows an illustrative example of a Web page 500 which may be provided to users that have indicated an intent to help with translation. The Web page 500 may have been sent, for example, to any user that has indicated an intent to assist with translations or may be selectively provided to certain users, such as users that have signed up to be translators, to users that have demonstrated a level of proficiency for translating, and the like. Also, variations the page 500 may be provided to users, such as users identified as understanding more than one language in order to entice the users to sign up as translators of content. In this illustrative example, the Web page 500 may be provided to a user that has selected the translation button 108 in FIG. 1, the improvement button 210 shown in FIG. 2, the improvement button 316 shown in FIG. 3, or the translation improvement button 408 of FIG. 4. Generally, the Web page 500 may be provided to a user subsequent to the receipt of any indication of user intent and/or interest in assisting with translation, or in any suitable manner.

In this example, the Web page 500 includes content 502, which in this example, is identical to the review 102 shown in FIG. 1. The content 502 is provided along with a translation input box 504, which an embodiment is an interface element that allows a user to type, paste or otherwise input a translation of the content 502. In this example, the original content 502 is parsed into sentences, allowing a translator to input translations for one or more of the sentences of the content 502. A submission button 506 allows a user to select the button in order to send a completed translation to an appropriate server which receives the translation and forwards the translation appropriately, such as to a computer system operable to store the translation in a data store. If the user only provided translations for portions of the content 502, then the translated portions may be submitted upon selection of the submission button 506. A system that receives a submitted translation may identify the language into which the content was translated using various techniques. In one embodiment, the system detects the language of the translation. Language abilities of users stored in user profiles may be used to determine a language of a translation. Users may also be able to specify the language of the translation. For instance, the Web page may include a drop-down box or other interface element that allows the user to select the language of the translation.

Also in this example, various other translations 508 of the content 502 that were perhaps submitted by other users, or that have provided by various translation tools, or by a combination of other users and automated translation tools may be provided to the user in the Web page 500 in order to assist the user in preparing the translation or at least to provide the user with examples of how content has been previously translated. Thus, for instance, if the user is not certain how to translate a particular phrase, he or she may see how others have translated the phrase and may use that phrase if he or she thinks that the translation of the phrase is correct. In this example, translations by other translators are in Russian even though translations may have been received for other languages. In an embodiment, translations by other users (or by automated methods) may be provided to a user based at least in part on the languages the user understands. Thus, in this example, the user is provided translations in Russian. However, translations by others may be provided in other languages. For example, translations received for all or some languages into which the content 502 has been translated may be provided. In an embodiment, users are able to self select in a user interface, such as a profile creation and/or editing page, the languages he or she is able to or willing to translate.

In addition, as shown in this example, the Web page 500 includes a yes button 510 and a no button 512 which may operate similarly to the yes button 214 and no button 216 in order to allow the user to indicate whether he or she thinks that each of the other translations 508 is good. In this manner, the votes of people participating in translations may be used to determine the quality of various translations. In other words, in this manner, the translators are provided an opportunity to be reviewers as well.

It should be noted that the Web pages shown in FIGS. 1-5 are provided for the purpose of illustration and that variations are contemplated as being in the spirit of the present disclosure. For instance, FIGS. 1-5 specifically show respective Web pages displayed utilizing a particular browser application, although other ways of displaying content to users would be utilized. For example, an application dedicated to translation services may be utilized in order to display content to users. In addition, the Web pages shown in FIGS. 1-5 show particular arrangements of content interface elements and the like for the purpose of illustration, but other arrangements may be used. For instance, generally, any interface elements that allow users to communicate translations and opinions thereof may be used. In addition, while the examples shown in FIGS. 1-5 provide an illustrative example of content being in the form of user-generated reviews, embodiments in the present disclosure may be used in order to provide translations of other content. For instance, any user-generated content may be translated in accordance with various embodiments described herein. Generally, any translatable content may be translated using the embodiment described and variations thereof. Examples of content that may be translated include text in one or more languages, audio files (or portions thereof) having spoken words in one or more languages, video files (or portions thereof) with audio tracks having spoken words in one or more languages and/or subtitles in one or more languages, video files showing one or more visual languages, such as American Sign Language, and, generally, any content that is used for expression in one or more languages.

Figure 6:
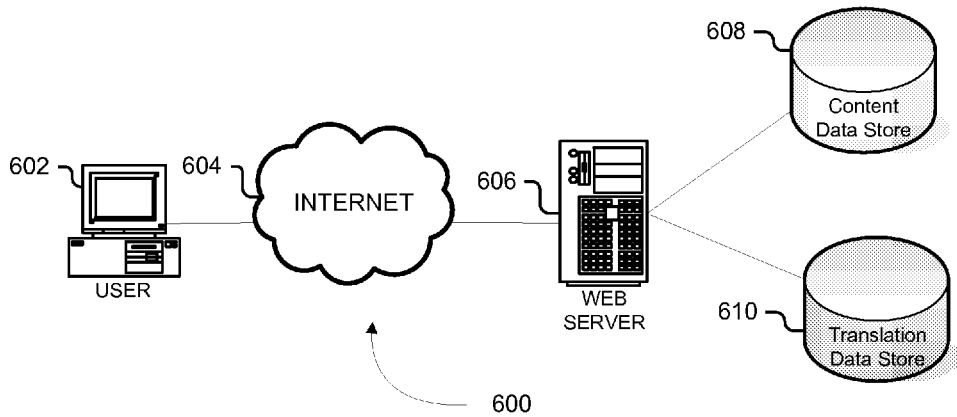
FIG. 6 shows an illustrative example of an embodiment in which various embodiments can be implemented.

FIG. 6 shows an illustrative example of an environment 600 in which various embodiments of the present disclosure may be implemented. The environment 600 may be used, for instance, to communicate the Web pages shown in FIGS. 1-5, variations thereof, and user interactions therewith. In this example, a user device 602 communicates over the Internet 604 with a Web server 606 in order to access various Web pages of the website provided by Web server 606 and to communicate interaction therewith. The user device 602 may be any device that may be used in order to view, hear, or otherwise access content. The examples include, but are not limited to, desktop computers, notebook computers, mobile devices, electronic book readers, tablet-computing devices and generally any computing device with which content can be provided to users. Further, while the environment 600 is shown as including the Internet 604, other communications networks may be used, including any suitable network for communicating information, such as an internal network of an organization or a mobile network and/or combinations of networks.

In the environment 600 as shown in FIG. 6, the Web server 606 accesses a content data store system 608 in order to provide content to the user 602. The content data store 608 may include, for example, hypertext markup language (HTML) files, extensible markup language (XML) files and/or generally data records that contain content. The content can be any content which is used to express information in a language, such as any of the various types of content discussed above.

The Web server 606 also, in an embodiment, accesses a translation data store 610 which, in an embodiment, includes translations of some of the content in the content data store 608 and/or portions thereof. For instance, using the example of FIGS. 1-5, user-generated reviews that have been translated using various means may be stored in the translation data store 610. Data in the translation data store 610 may be organized in a manner associating translations with content of which the translations are translated. With the example of FIGS. 1 and 2, for instance, the review 202 of FIG. 2 may be stored in the translation data store 610 in a manner that associates the translation 202 of FIG. 2 with the review 102 of FIG. 1. One or more relational database tables may be used to associate translations with corresponding content. Generally, data in the translation data store 610 may be stored in any manner that allows for location of translations of corresponding content. Data in the translation data store may also be stored in a manner that identifies the language of the translation. Thus, for instance, if the review 102 of FIG. 1 has been translated into multiple languages, an appropriate translation may be readily available from the translation data store 610 of FIG. 6.

The specific arrangement in FIG. 6 is provided for the purpose of this illustration and other environments may be utilized in accordance with various embodiments. For instance, the figure of FIG. 6 shows a single user device 602, although, generally, multiple-user devices, which may be of different types, may utilize the Internet 604 or other communications network or combination of network to access the Web server 606. As another example, multiple Web servers may access the content of content data store 608 and the translation data store 610. In addition, for the purpose of illustration, only certain components of the environment 600 are shown and other components are not shown. For instance, a website may be provided collectively by multiple servers and not just a single Web server 606. Similarly, each of the content data store 608 and the translation data store 610 may comprise multiple data stores or be implemented in a single data store. The content data store 608 and translation data store 610 may also be accessed by the Web server 606 over the Internet or other network. Generally, other variations are also contemplated as being in the spirit of the disclosure.

Figure 7:
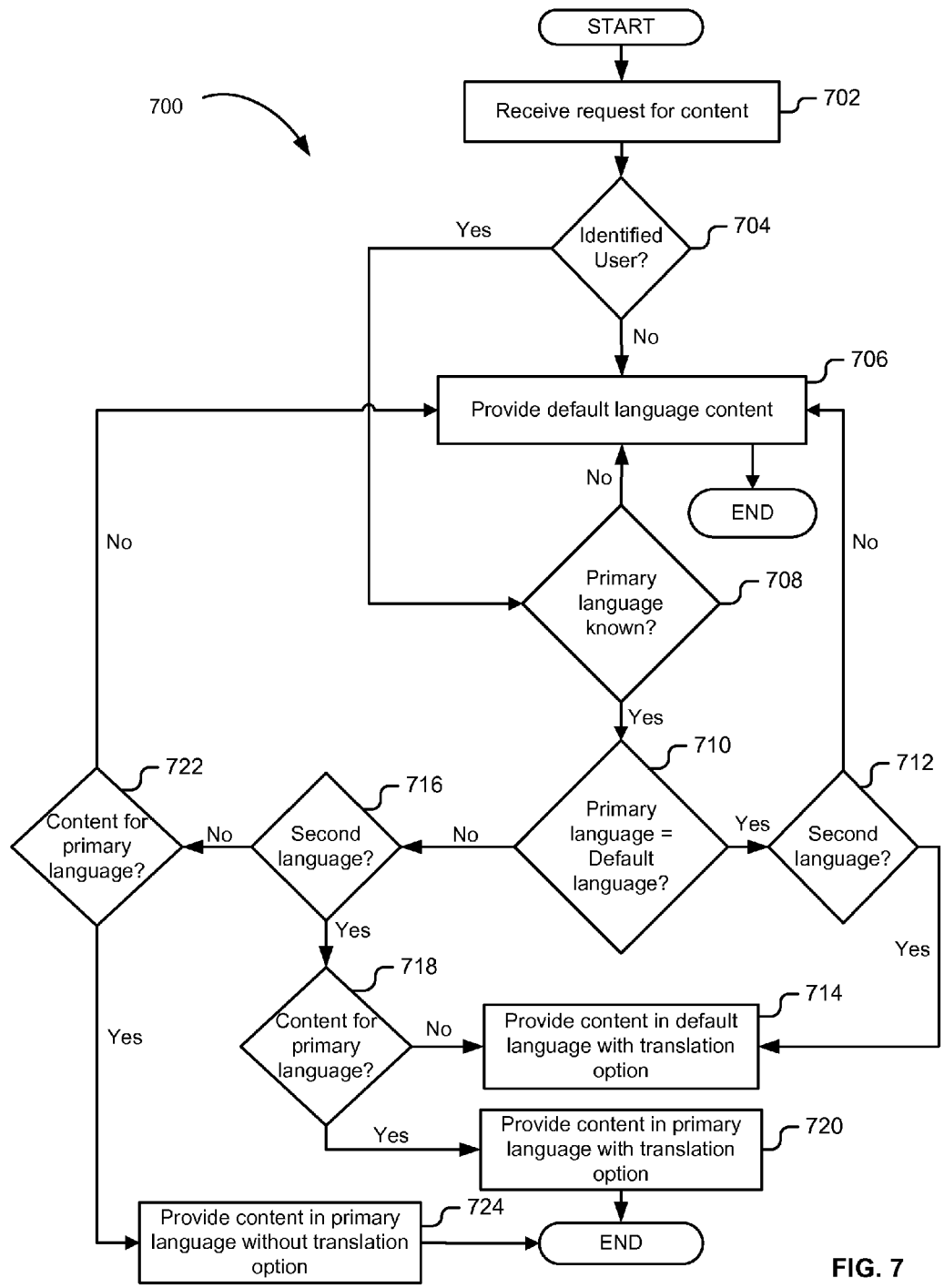
FIG. 7 shows a flowchart for an illustrative example of a process for providing content in accordance with an embodiment.

FIG. 7 shows a flowchart for an illustrative example of a process 700 for providing content in accordance with an embodiment. The illustrative process 700 may be used to provide translations of content to users when appropriate and when such translations are available, as discussed more below. Portions of the process 300 (or any other processes described herein or variations and/or combinations thereof) may be performed under the control of one or more computer systems configured with executable instructions and may be implemented as code (e.g., executable instructions of one or more computer programs, or one or more applications executing collectively on one or more processors, by hardware, or combinations thereof). The code may be stored on a computer-readable storage medium; for example, in the form of a computer program comprising a plurality of instructions executable by one or more processors.

As noted, the process 700, or variations thereof, may be used to, in appropriate situations, identify and provide appropriate translations of content to present to a user. In an embodiment, the request for content is received 702 in accordance with an embodiment. The request for content may be received in any suitable manner. For instance, the request for content may be a hypertext transfer protocol (HTTP) request sent by a user device in connection with a Web browser executing on the user device. The request may be sent over a communications network to a server operable to receive the HTTP request and respond with content accordingly. Generally, however, the request for content may be made in other ways. In an embodiment, once the content is received, a determination is made 704 whether an identity of a user associated with the request for content is ascertained. The determination whether the user's identity is ascertained may be performed in any suitable manner. For instance, a cookie associated with the user may have been sent from a computing device of the user and used in order to identify the user from a data store that associates cookies with user accounts. The user also may have provided identification information, such as during an authentication process utilizing a username and password input by the user. Generally, any method of identifying the user and/or determining whether or not the user is identified may be used.

In an embodiment, if the identity of the user is not ascertained, then content is provided 706 in a default language. For instance, in an electronic commerce website dedicated to offering items for consumption in North America, website content may be provided in English. Similarly, the default language for a website primarily directed to users in Russia or to Russian speakers in another location may be in Russian. Generally, the default language may be in any language. If, however, the user's identity is ascertained, then a determination is made 708 whether a primary language of the user is known. For instance, a user may have a user profile stored in connection with the website from which content was requested. User profile may identify the primary language of the user. Similarly, information about the user may be used to deduce a primary language of the user. For instance, if it is known that the user visits many websites that are in a particular language, that particular language may be assumed to be a primary language of the user. Similarly, if the request for content was received from a Web page of a particular language, that particular language may be assumed to be the primary language of the user. Information about the website from which the user navigated may be ascertained, for instance, from an HTTP referrer value provided with the request for content discussed above, in an embodiment. In any event, if the primary language of the user is not known, in an embodiment, then content in the default language is provided 706 in accordance with the embodiment.

If the primary language is known, however, then a determination is made 710 whether the primary language is the same as the default language. If the primary language is the same as the default language, then, in an embodiment, a determination is made 712 whether the user understands a second language. If the primary language is the default language and a second language is not known for the user, then, in an embodiment, content is provided 706 in the default language. Determination of whether the user communicates or otherwise understands the second language may be performed in a suitable manner, such as by referencing a profile of the user or by deducing or otherwise assuming the user understands a second language based on other information known about the user, such as a language on the website from which the user has navigated.

If the primary language of the user is a default language and it is determined that the user understands a second language, then in an embodiment, content is provided 714 in the default language with a translation option. Providing content with a translation option may be done in any suitable manner. In an embodiment, providing content with a translation option includes providing to the user content with an interface element that is selectable by the user for allowing the user to navigate to a page in which the user may provide a translation. For instance, the translation button 108 of FIG. 1, or a similarly functional interface element, may be provided with content provided to the user. In an embodiment, if the primary language is not a default language, however, a determination is made 716, nevertheless, whether the user understands a second language. If a determination is made 716 that the user understands the second language in an embodiment, a determination is made 718 whether there is content available for the user's primary language, such as whether a translation of the requested content or a portion thereof is stored in the data store. If content is not available for the user's primary language, then in an embodiment, content is provided 714 in the default language with a translation option, such as in the manner described above. If, however, there is content available for the user's primary language and it is determined that the user understands a second language, then the content is provided 720 in the primary language with the translation option. If the requested content was for a particular Web page, for instance, a translation into the user's primary language may be provided to the user with a translation option in accordance with the embodiment. If, however, it is determined that the user does not understand the second language or it is simply not known that the user understands a second language, a determination is made 722 whether there is content available for the primary language. If content is not available for the primary language, then content is provided in the default language 706 which may be with or without translation function. If, however, content is available for the user's primary language, then in an embodiment, content is provided in the primary language 724 without a translation option. Thus, if the requested content is a Web page, a translation of the Web page may be provided to the user without a translation option in accordance with an embodiment.

Of course, the process illustrated in FIG. 7 includes specific actions for the purpose of illustration and variations of the methods 700 are possible. For instance, a translation option may be provided to the user regardless of any determinations about the user's ability to understand another language, whether or not such determinations are made. Also, more sophisticated criteria than that described above may be utilized in order to determine the language in which content should be provided to the user and/or whether or not to provide a translation to the user with the provided content. As another example, the process 700 described above may be modified to take into account users who speak multiple languages. For users that speak more than two languages, for example, the process 700 may include selecting content in a language selected from multiple languages understood by the users. Rankings of languages may be stored for users that understand multiple languages and, for a user, content in the highest ranked language that is available may be provided to the user. Rankings may be based at least in part on user input indicating a ranking and/or may be derived from user activity in connection with content in various languages. As an example, if a user often navigates to pages with content in Ukrainian, but less often navigates to pages with content in Russian, Ukrainian may be ranked higher for the user than Russian and, if available, content in Ukrainian may be selected over content in Russian. Other variations are considered within the scope of the present disclosure.

Figure 8:
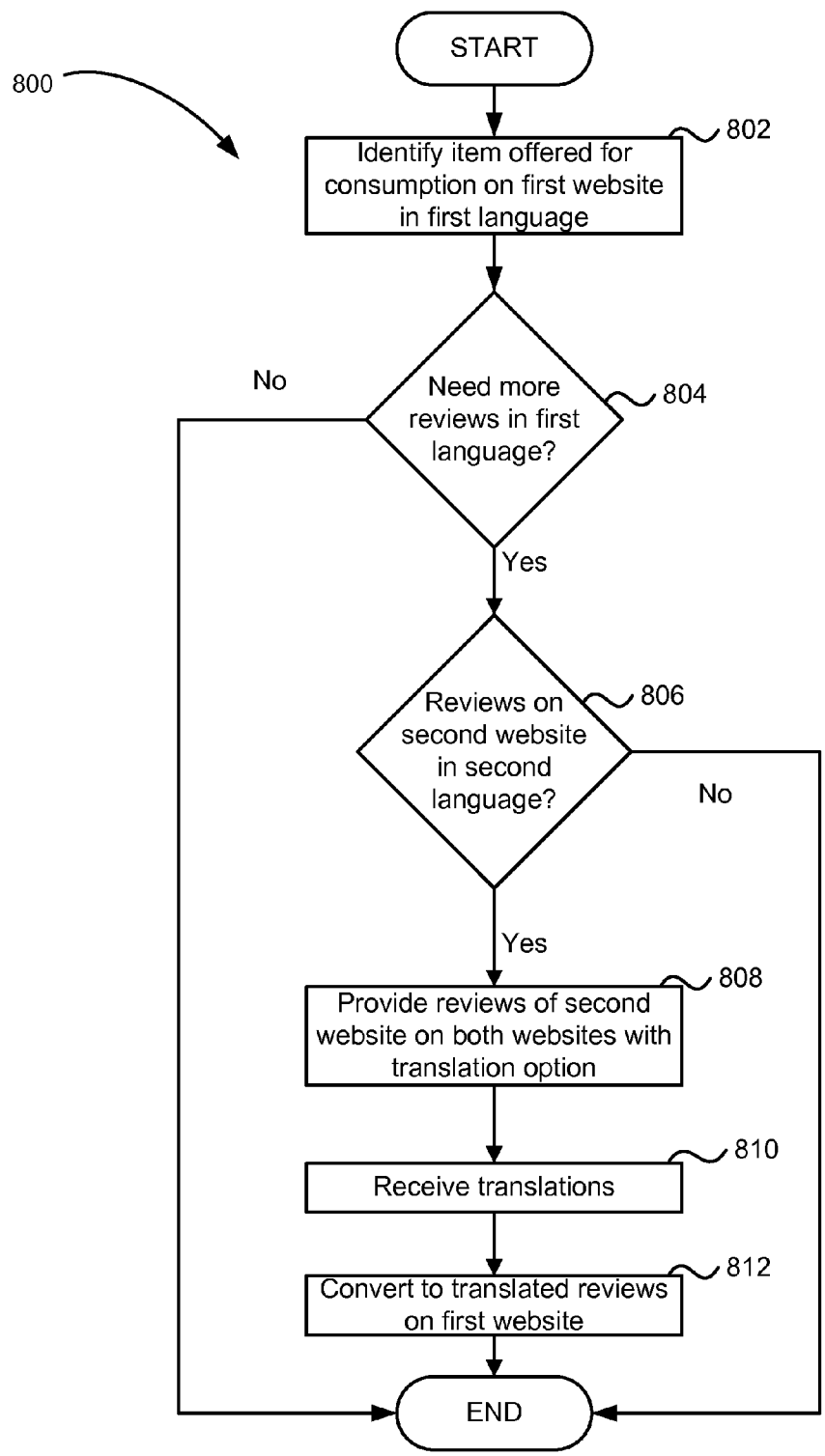
FIG. 8 shows a flowchart for an illustrative example of a process for providing translated content in accordance with an embodiment.

In some instances, it may be desirable to limit the abilities of users to provide translations. It may be desirable, for example, to selectively provide options for translating content to users so that users' efforts are more likely to be spent translating content that is in greater need of translation. Accordingly, FIG. 8 shows a flowchart for an illustrative example of a process 800 that may be used in order to selectively provide translation options as content in order to increase the chance of any content being translated for content in which there is a greater need for translation. The process of FIG. 8 and the following description describes the process 800 in terms of user reviews, such as those shown in FIGS. 1-5, although the process 800 may be applicable to any translatable content. In this particular example of FIG. 8, the process 800 is provided in connection with the examples shown in FIGS. 1-5 where an entity operates a website to offer items for consumption in another language, such as by launching a new website in another country or simply by providing translated content on an originally existing website. Variations of the process 800 may be used in various other contexts.

In an embodiment, an item on a first website in a first language is identified 802. For instance, the process 800 may be performed repeatedly for all items offered for consumption on a website. Each item offered for consumption on the website may be identified sequentially.

Identification of an item for consumption may also be performed in other ways, such as in ways that are based upon user input indicating user's intent on identifying the item. For instance, an administrator or even a user may identify through user input the item offered for consumption. As another example, identification of an item may occur when a user in some manner indicates that a translation of content related to the item would be helpful, such as by making an appropriate selection through a website interface.

In an embodiment, once the item is identified, a determination is made 804 whether more reviews for the item are needed in the first language. Thus, for instance, if the first language is Russian, a determination may be made whether more reviews are needed in Russian in order to provide users with a robust experience. A robust experience may be provided to users, for instance, when the number of reviews available for an item in a language of the users exceeds a threshold. In an embodiment, if more reviews are needed in the first language, then a determination is made 806 whether there are reviews for the identified item on a second website in a second language. Thus, continuing the same example, if the identified item is offered for consumption on a Russian website, a determination may be made whether reviews for that item are available on a second, English-language website. Of course, other languages may be used. If reviews for the identified item for consumption are available, then in an embodiment, the reviews of the second website in the second language are provided 808 on both websites with a translation option. In this manner, reviews are available to viewers on a first website, albeit in a second language. Also in this manner, if visitors to the first website understand the second language, they have the benefit of reading the reviews and, in an embodiment, the option of translating reviews for other users. Similarly, visitors to the second website are provided the option of translating the reviews, thereby making translations of the reviews available on the first website.

With the reviews on both websites provided with translation options, the translations are received 810 in accordance with an embodiment. Translations may be received, for instance, in connection with user interface, such as Web page, similar to the Web page 500 described above in connection with FIG. 5 or, generally, any suitable interface or in any suitable manner. Once translations are received in an embodiment, reviews in the second language on the first website that have been translated are converted 812 to their translations in accordance with the embodiment. Thus, visitors of the first website may see translations of the original reviews, such as in the manner described above in connection with FIGS. 1-4.

Variations of the process 800 described above are contemplated as being within the scope of the present disclosure. For instance, for the purpose of illustration, FIG. 8 shows simply providing the reviews of the second website on both websites with the translation option. However, more sophisticated processes may be used. For instance, translation options may be only provided to users who satisfy certain criteria, such as users identified as understanding the second language or identified as being able to translate into the first language. In addition, one or more criteria may be used in order to determine when to replace reviews in the second language on the first website with translations. For example, translations of the reviews may be provided on the website in the first language only responsive to conditions indicative of the reviews being reliable being satisfied and/or responsive to user request for translations. For instance, a user visiting the first website may see a review in the second language in proximity to an option for requesting a translation of the review even though a translation for the review has been received. In other words, the translated review is not provided to the user automatically because the review has not been identified as being reliable. However, if the user requests the translation, the review not identified as reliable may be provided to the user. Of course, other variations are contemplated as being within the spirit of the present disclosure.

Figure 9:
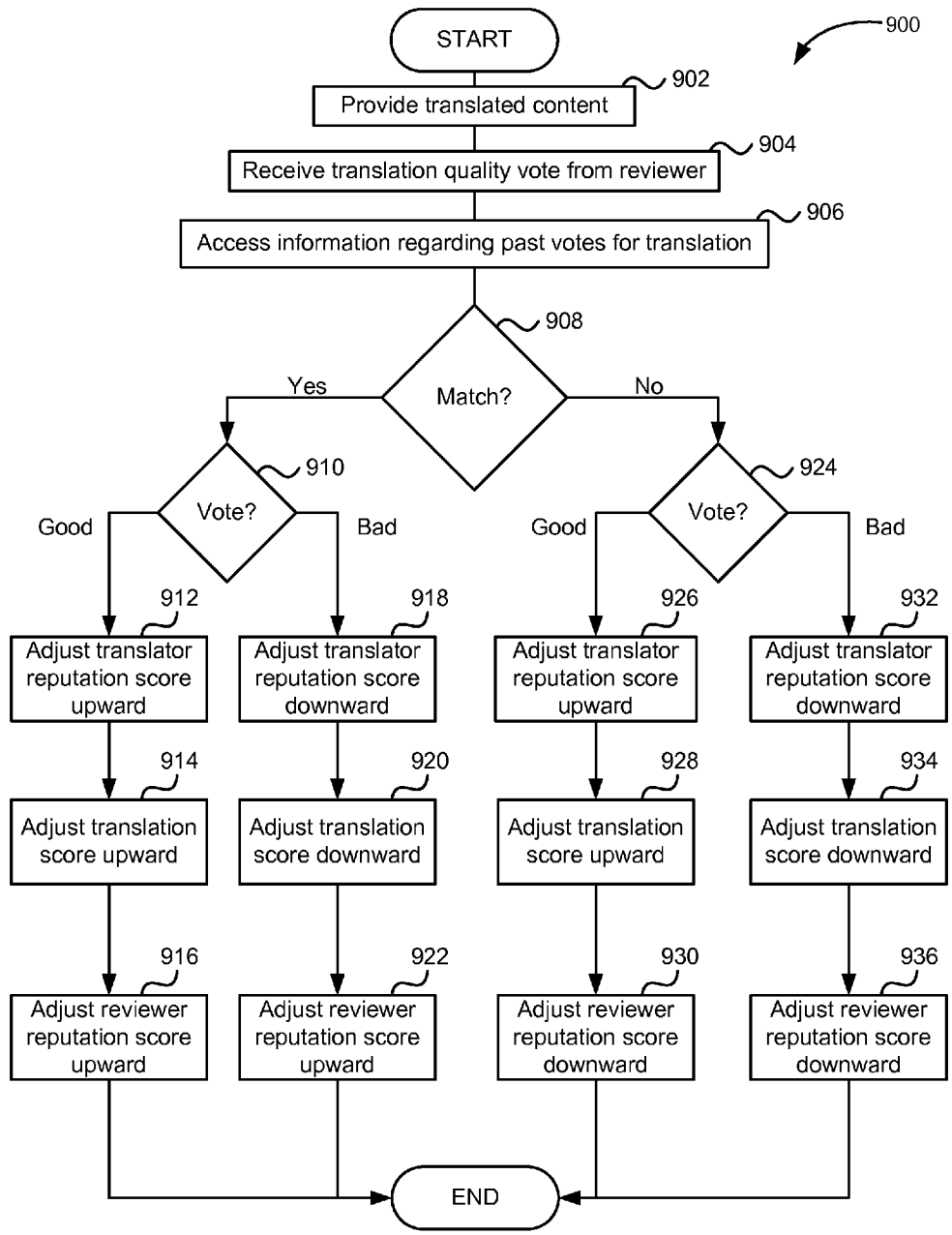
FIG. 9 shows a flowchart for an illustrative example of a process for grading translator's translations and reviewers of translations in accordance with an embodiment.

As discussed, translations, reviewers, and/or translators may be rated in accordance with various embodiments. FIG. 9 shows a flowchart for an illustrative example of a process 900 that may be used in order to rate translations and reviewers of translations. A translator in an embodiment is a user, computing device, or application operating on a computing device that translates content. For instance, in an embodiment, the translator is a person that manually provides translations by composing translations and submitting translations through an interface. In an embodiment, the process 900 includes providing 902 translated content. Translated content may be provided in any manner, such as in the manner described above in connection with FIGS. 2-4 or in other ways, such as through the application and even in physical ways, such as by providing the physical printout of translated content. Once the translated content is received, in an embodiment, a translation quality vote is received 904 from a reviewer. A translation quality vote in an embodiment is an indication from a user about the user's opinion of the quality of the translation. For instance, referring to FIG. 2, a quality vote may be received in accordance with user selection of the yes button 214 or the no button 216 shown in the figure. In an embodiment, a quality vote is a value that indicates a user's opinion whether the translation is good or bad, although other values, such as values in a numerical range may be used. In an embodiment, when the quality vote is received, information regarding past votes for the translation is access 906. A record in a data store corresponding to the translation may be accessed. The record may include information of the past votes, including statistics, such as how many votes the translation received, the types of votes received (yes, no, good, bad, and the like), ratings of users that submitted the votes, the identities of users that submitted the votes, and/or generally any information relevant to the voting process described herein.

In an embodiment, a determination is made 908 whether the received translation quality vote matches past votes received for the translation. For instance, if a translation has received primarily good votes and the received translation quality vote is a bad vote, then determination may be made if there is not a match. Similarly, if past votes have primarily been good votes and the translation quality vote is also a good vote, then a determination may be made that received translation quality votes matches. More sophisticated ways of determining whether there is a match may also be used. For instance, in a system where users rank translations on more refined scales (for example votes that rank translations on a scale, such as a number of stars out of five stars), a distance from an average ranking may be used to determine whether there is a match. For example, if a scale from one to five is used, with five indicating the highest ranking a voter can give a translation, the difference between a vote for a translation and the average of votes already received for the translation may be used to determine whether the vote matches the past votes. If the difference is greater than two, then it may be considered that there is not a match. Thus, if the average ranking for a translation is four and a half and a vote for a ranking of two is received, it may be determined that there is a match. However, if the vote indicated a ranking of three, then it may be determined that there is a match. Other scales and methods of determining whether there is a match may be used.

In an embodiment, if there is a match between the received translation quality vote and the past votes, then a determination is made 910 whether the received translation quality vote is a good vote or a bad vote. If the received translation quality vote is a good vote, then a translator reputation score for a translator that provided the translation quality vote is adjusted 912 upward in accordance with an embodiment. A translator reputation score may be any score that is indicative of a corresponding translator's quality. For instance, for a particular translator, a translator reputation score may be:

$$T = \frac{\sum_t ts(t)}{\sum_t 1}$$

where T represents the translator's translator reputation score, t represents a translation provided by the translator, and ts(t) represents a translation score of the translation score t. Thus, in this example, the translation score T is an average of the translation scores of translations provided by the translators. Other translation scores may be used. For instance, the sums shown in the example translation score may be weighted by reviewer quality such that translations reviewed by higher quality reviewers will affect the score more than translations reviewed by lower quality reviewers.

In addition, in an embodiment, if there is a match between the received translation quality vote and the past votes and the translation quality vote is a good vote, a translation score for the translation itself is adjusted 914 upward and a reviewer reputation score for the reviewer that submitted the received translation quality vote is adjusted 916 upward as well. A translation score for a translation may be any score that indicates a quality of the translation. For instance, a translation score of a translation t may be:

$$ts(t) = \frac{\sum_v q(v) r(v)}{\sum_r 1}$$

where ts(t) represents the translation score (which may be the same as or different from the translation score described above) for a translation t, v represents a vote submitted for the translation t, q(v) is a function that has a value of one if v is a good vote and a value of zero if v is a bad vote, and r(v) is a reviewer score for the reviewer that submitted the vote v. In this manner, the translation score represents the sum of the good votes for the translation, weighted by the reviewer score, divided by the total number of votes received for the translation. Other translation scores may be used as well. For example, in the above equation for the translation score ts(t), q(v) may take on a value of negative one or another value for bad votes. As another example, the translation score may simply be the number of good votes received for the translation divided by the total number of votes received for the translation (whether good or bad).

The reviewer score may be any score that indicates a quality of a reviewer. For example, a reviewer score may be determined as:

$$R = \frac{\sum_r a(r)}{\sum_r v(r)}$$

where R represents the reviewer score for a reviewer, r represents a review submitted by the reviewer, a(r) represents the number of users that have reviewed the translation of the review r and that agree with the review r, and v(r) represents the total number of votes received for a translation reviewed by the review r. In this example, therefore, a reviewer's reviewer score is the number of reviews by other users that agree with the reviewer's reviews divided by the total number of votes for translations that the reviewer has reviewed. Other reviewer scores may be used. For instance, the sums shown may be weighted by one or more factors, such as translator scores of reviewers with which a particular review does or does not agree.

In this manner of adjusting the translator score and translation score, scores representative of a translator's reputation, the translation's quality, and a reviewer's reputation are all increased because the reviewer and past voters agree that the translation is good. Also, because the reviewer agrees with other reviewers, the reviewer has his or her reputation score increased because of the agreement with other reviewers.

In an embodiment, if there is a match between the received translation quality vote and the past votes, but the received translation quality vote was a bad vote, then the translator reputation score is adjusted 918 downward, the translation score is adjusted 920 downward, and the reputation reviewer score is adjusted 922 upward. In this manner, a score indicative of the translator's reputation is adjusted downward because both the reviewer and past reviewers agree that the translation is bad. Similarly, because the reviewer and past reviewers agree that the translation is bad, the translation score is adjusted downward. But because the reviewer agree with past reviewers, the reviewer's reputation score is adjusted upward.

If in an embodiment there is not a match between the received translation quality vote and past votes, a determination is made 924 whether the received translation quality vote was good or bad. If the received translation quality vote was good, then the translator reputation score is adjusted 926 upward, the translation score is adjusted 928 upward and the reviewer reputation score is adjusted 930 downward. The translator reputation score is adjusted downward because, collectively, the votes indicate less agreement on the quality of the translator of this particular translation done by the translator. Similarly, the translation score is adjusted upward because the received translation quality vote is good, which is in disagreement with the past votes, indicates that the translation is not as bad as the past votes had indicated. In other words, the translation score is adjusted upward because there is less agreement among users that the translation is bad. The reviewer score in this instance is adjusted downward because the reviewer does not agree with other reviewers.

In an embodiment, if there is not a match between the received translation quality vote and the past vote, and the received translation quality vote is a bad vote, then in an embodiment, the translator reputation score is adjusted 932 downward, the translation score is adjusted 934 downward and the reviewer reputation score is adjusted 936 downward. In this manner, the translator reputation score is adjusted downward because there is less agreement about the translation of the translator being good. Similarly, the translation score is adjusted downward because there is less agreement among users that the translation itself is good and the reviewer's reputation score is adjusted downward because the reviewer did not agree with past reviewers.

The process 900 may be performed in connection with a translation every time a vote regarding the translation's quality is received in accordance with an embodiment. Variations of the process 900 are also contemplated as being in the spirit of the present disclosure. For instance, multiple votes may be received before translator reputation scores, translation scores and reviewer reputation scores are adjusted. In this manner, more information is collected from users before conclusions are made about the translation's quality. In addition, while process 900 shows the reviewer's reputation score being adjusted, all reviewers having reviewed the translations may have their scores adjusted as well. For instance, past reviewers of the translation may have their scores adjusted upward when the current reviewer agrees about the translation's quality. Similarly, past reviewers may have their scores adjusted downward when the current reviewer disagrees with the translation's quality. In this manner, if reviewers initially agree about a translation, but then more reviewers come along and disagree, then the reviewers that disagree will ultimately cause scores to be adjusted and corrected accordingly.

Figure 10:
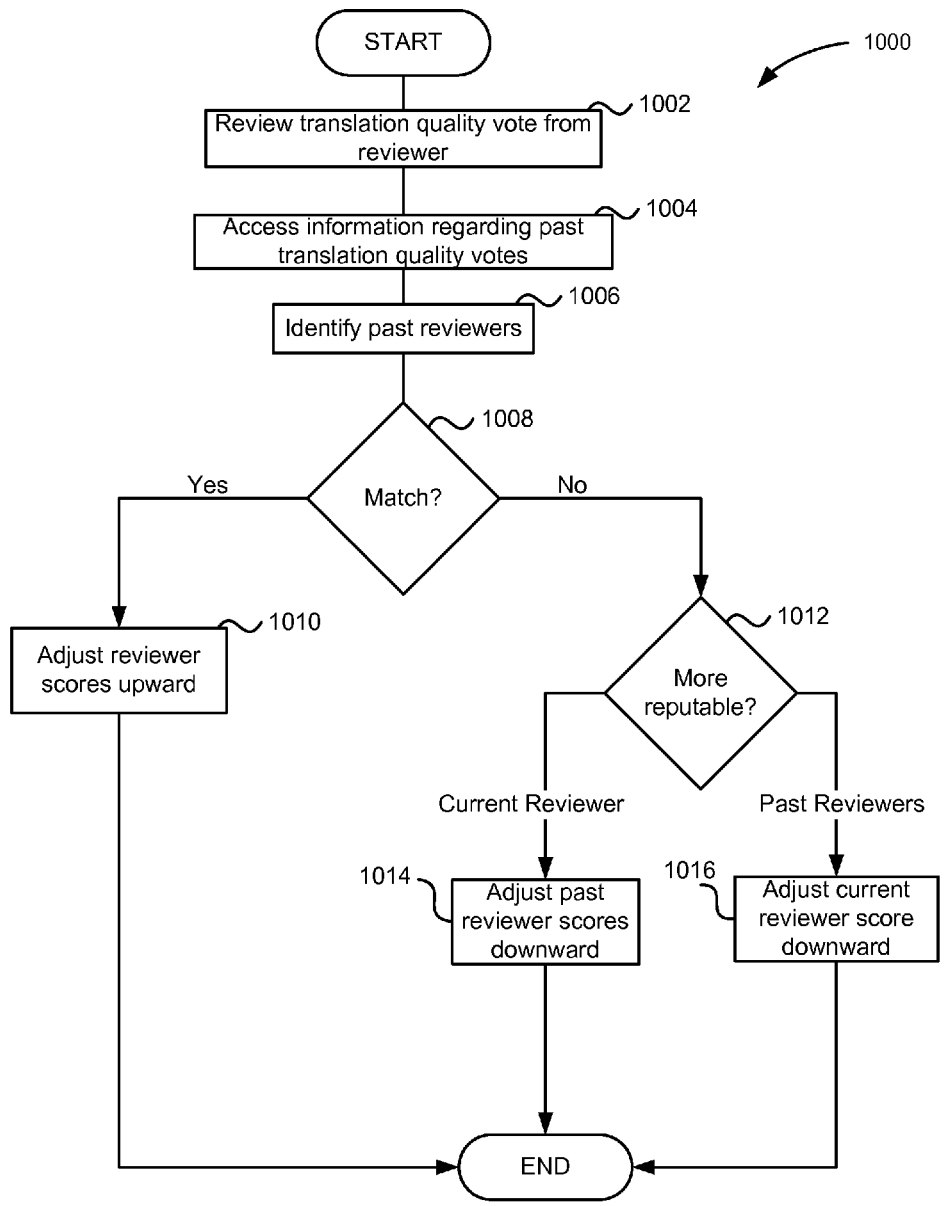
FIG. 10 shows a flowchart for an illustrative example of a process for scoring translation reviewers in accordance with an embodiment.

As noted, when one reviewer of the translation votes, the scores of multiple reviewers may be adjusted due to the fact that the statistics regarding agreement among reviewers has changed due to the received vote. Accordingly, FIG. 10 shows a flowchart for an illustrative example of a process 1000 that may be used to adjust reviewer scores in accordance with the embodiment. In an embodiment, the process 1000 includes receiving 1002 a translation quality vote from a reviewer. The translation quality vote may be received such as in a manner described above. In addition, information regarding past translation quality votes is access 1004 in accordance with the embodiment, such as in the manner described above. When the information regarding the past translation votes is accessed in an embodiment, past reviewers are identified 1006. Past reviewers may be identified so that the scores for the past reviewers may be adjusted according to the nature of the received translation quality vote.

In an embodiment, a determination is made 1008, based at least in part on the received translation quality vote and the accessed information regarding past votes, whether there is a match between the received translation quality vote and the past votes. If there is a match between the received translation quality vote and the past votes, then in an embodiment, all reviewer's reputation scores are adjusted 1010 upward accordingly. However, if in an embodiment, there is not a match between the received translation quality vote and the past votes, then a determination is made 1012 whether the current reviewer is more reputable than the past reviewers. Determining whether the current reviewer is more reputable than the past reviewers may be accomplished in any suitable manner. For instance, in an embodiment, determining whether the current reviewer is more reputable than the past reviewer is performed by comparing a reviewer reputation score of the current reviewer with an average of the reviewer reputation score of the past reviewers. More sophisticated ways of determining whether the current viewer is more reputable than the past reviewer may be used. For instance, in an embodiment, if the past reviewers include a threshold number of reviewers that have corresponding reputation scores exceeding a reputation score threshold, those reviewers having the reputation scores exceeding the reputation score threshold may be compared with the current reviewer. If user reputation scores do not exceed reputation score threshold, they are not considered or are considered with less weight. In this manner, a group of highly rated translators are used as a basis for comparison in order to prevent situations such as when there's general agreement among past reviewers about the translation, but the average reputation score is low for various reasons. For instance, there may be many reviewers with low reputation scores, but nevertheless agree with just a few reviewers having high reputation scores. In other words, low reputation scores by themselves may not be indicative of a reviewer's quality, but may simply be due to having performed few activities as a reviewer.

In any event, in an embodiment, if it is determined that the current reviewer is more reputable than the past reviewer, then the past reviewer's scores are adjusted 1014 downward in accordance with an embodiment. If, however, the past reviewer is determined to be more reputable than the current reviewer, then the current reviewer's score is adjusted 1016 downward. In this manner, only the less reputable of the reviewer or past reviewers have their corresponding reviewer reputation score(s) adjusted downward, thereby preventing a number of bad reviewers affecting the score of a good reviewer.

Variations of the process 1000 are considered as being within the scope of the present disclosure. In addition, variations and combinations of the processes described above are also considered as being within the scope of the present disclosure, including variations described above in connection with other processes. For instance, scores are adjusted as votes are received; however, users, whether translators or reviewers, may have their own reputation scores changed over time. Thus, in an embodiment, data that is collected recording who has voted for which translation and reputation scores and translation scores may be adjusted accordingly as user reputation scores change over time. As an example, if a reviewer becomes a highly rated reviewer, then that reviewer's past actions may be provided more weight in recalculating scores for translation and reviewers connected with the reviewer having the high reputation score. Similarly, if a user initially has a high reputation score, but his or her score diminishes over time, the effect that user has had in the past may also diminish over time because of the realization that the reviewer should have less influence than what was initially given. As yet another example, one or more quality-control mechanisms may be in place to enhance the quality of scores computed in accordance with various embodiments. Votes, for instance, may be checked for uniqueness to prevent users from voting multiple times on the same translation. Users may be prevented from voting multiple times on the same translation and/or multiple votes from a single user for the same translation may be disregarded or at least provided less weight in calculations of scores. Similarly, users may be prevented from voting for translations that they themselves submitted. As above, users may simply be prevented from voting on their own translations and/or votes from a user for his or her own translation may be disregarded or given less weight.

Figure 11:
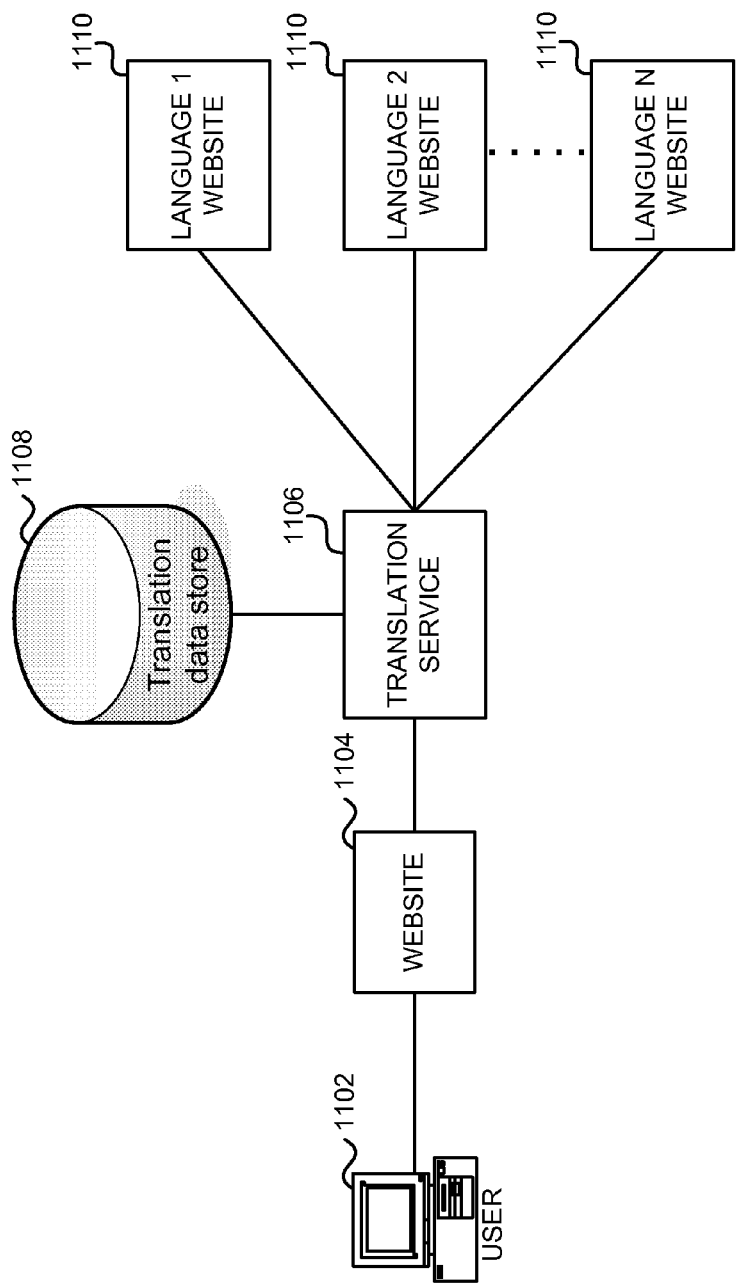
FIG. 11 illustrates another environment in which various embodiments can be implemented.

Embodiments of the present disclosure may be used to provide translations to various entities. FIG. 11 shows an illustrative example of an environment 1100 which may be used in order to provide content in accordance with an embodiment. The components of the environment 1100 may implement one or more of the embodiments described herein or variations thereof. In this particular example, a user device 1102 accesses a website 1104, such as in the manner described above. An operator of the website 1104 may wish to provide translated content to a user of the user device 1102 and therefore may utilize a translation web service 1106. A translation web service in an embodiment is a web service that receives requests for translations and provides translation in response, either immediately or when translations become available. The website 1104 and the translation 1106 may be operated by the same entity or by different entities. For instance, the translation web service 1106 may provide services to many websites 1104 that are in need of translated content. In an embodiment, the translation web service 1106 provides an application programming interface (API) that is callable by devices utilized in connection with the website 1104. For instance, the website 1104 may send a call to the translation web service 1106. The call may include the content to be translated, or identification thereof, and an identification of a language or multiple languages into which the content should be translated. The call may also include the identification of the language of the content that was provided, although the language of the content that was provided may be detected by the translation web service.

When the translation web service 1106 receives a request for a translation in an embodiment, the translation web service acts as a translation data store 1108, which includes past translation. The content to be translated may be parsed and if there are strings or other portions of the content already translated in the translation data store 1108, then a translation of those portions may be accessed. All of the content or the remaining portion of the content may be translated in any suitable manner, such as in a manner described above. For instance, the content may be provided on a website, such as the website 500 shown in FIG. 5 for a user to translate. In addition to the foregoing, the translation web service 1106 may be operated in connection with its own website. For instance, as shown in the diagram, the translation web service communicates with various websites 1110 in different languages. Websites may be translations of an electronic commerce website operated in connection with the translation web service. Thus, the translation web service 1106 may provide translations to its own websites, as well as its third-party websites, such as the website 1104. The translation web service may or may not request a fee for translations provided to third parties. The translation web service may simply translate content for others in order to improve the data in the translation data store 1108.

Figure 12:
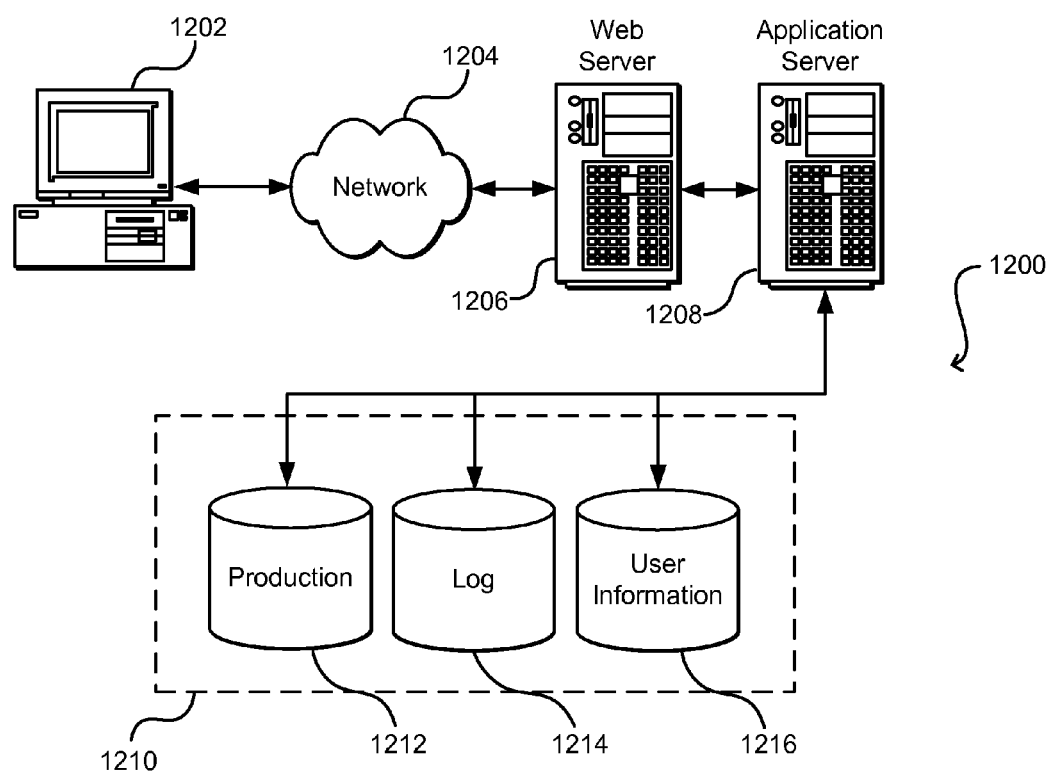
FIG. 12 illustrates an environment having components which may be utilized in implementation of various embodiments, including embodiments shown in FIGS. 6 and 11.

FIG. 12 illustrates an example of an environment 1200 for implementing aspects in accordance with various embodiments. FIG. 12, for example, illustrates various components that may be used in the environments described above and/or that may be used to implement the various techniques described above. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of providing content in a foreign language, comprising:
   receiving, by one or more processors, translations for individual content instances from one or more translators, wherein individual translators have associated therewith a translator score, and wherein the translator score is based at least in part on particular translation scores for particular translations submitted by an individual translator and reviewer scores associated with a plurality of reviewers of the particular translations submitted by the individual translator;
   providing for display the translations to the plurality of reviewers, wherein individual reviewers have associated therewith a reviewer score;
   receiving votes for at least one of the translations from at least one reviewer of the plurality of reviewers, the received votes indicating opinions of the at least one reviewer of the plurality of reviewers with regard to the at least one of the translations;
   for an individual translation of the translations for which one or more votes have been received from one or more reviewers of the plurality of reviewers, calculating, based at least in part on the received votes for the individual translation and the translator score, a current translation score for the individual translation;
   in response to a user request for content, selecting, based at least in part on one or more calculated current translation scores, a particular translation of a particular instance of the requested content; and
   providing for display the particular translation.

2. The computer-implemented method of claim 1, further comprising calculating the reviewer scores for the individual reviewers from the plurality of reviewers that have reviewed a common translation, and wherein calculating the current translation score is further based at least in part on the reviewer scores associated with the at least one reviewer that reviewed the current translation.

3. The computer-implemented method of claim 1, wherein the one or more translators are human translators and wherein receiving the translations includes receiving human-generated translations from devices utilized by the human translators.

4. The computer-implemented method of claim 1, wherein the individual content instances are associated with items offered for consumption on web pages in a first language and wherein providing for display the particular translation includes offering the items for consumption in connection with the particular translation.

5. The computer-implemented method of claim 2, wherein a reviewer of the set of reviewers, having a reviewer score above a threshold, impacts the calculated reviewer scores more heavily than reviewers of the set of reviewers having reviewer scores below the threshold.

6. A computer-implemented method for providing translated content, comprising:
   receiving, by one or more processors, from a translator, a translation of a content instance, wherein the translator is associated with a translator score that is based at least in part on particular translation scores for particular translations submitted by the translator and reviewer scores associated with one or more reviewers of the received translation;
   providing the received translation to the one or more reviewers;
   receiving one or more votes from a set of the one or more reviewers;
   calculating, based at least in part on the received one or more votes and the translator score for the translator, a translation score for the translation;
   determining, based at least in part on the calculated translation score, whether to provide the translation of the content instance; and
   when determined to provide the translation instance, in response to a user request corresponding to the content instance, providing the translation of the content instance for presentation to a user.

7. The computer-implemented method of claim 6, wherein the content instance includes text.

8. The computer-implemented method of claim 6, wherein the one or more reviewers have corresponding reviewer scores and wherein the method further comprises adjusting the corresponding reviewer scores of a particular reviewer of the one or more reviewers based at least in part on votes received from other reviewers of the plurality of reviewers.

9. The computer-implemented method of claim 6, wherein the translation of the content instance is from a first language to a second language, wherein the method further comprises:
   receiving other translations of other content instances from the translator; and
   receiving other votes for the other translations, the other translations individually having a corresponding translation score, the other translations including one or more translations to a language other than the second language, and wherein calculating the translator score is further based at least in part on the other received votes limited to votes received for translations from the first language to the second language.

10. One or more non-transitory computer-readable storage media having collectively stored thereon executable instructions for causing one or more computer systems to collectively at least:
   receive translations of a content instance from one or more translators, wherein individual translators have associated therewith a translator score that is based at least in part on particular translation scores for particular translations submitted by an individual translator and reviewer scores associated with one or more reviewers of the particular translations submitted by the individual translator;
   provide the received translations to the one or more reviewers;
   receive one or more votes from the one or more reviewers related to the received translations;

calculate a translation score for individual received translations, based at least in part on the received one or more votes and the translator score of the one or more translators;

select, based at least in part on the calculated translation score for the individual received translations, a particular translation of the content instance; and provide the selected particular translation.

11. The one or more non-transitory computer-readable storage media of claim 10, further comprising executable instructions that cause one or more computer systems to, for a particular reviewer of the one or more reviewers, calculate a reviewer score for the particular reviewer based at least in part on agreement of one or more votes received from the reviewer with one or more votes received from other reviewers, and wherein calculating the translation score for the translation of the individual received translations that the particular reviewer reviewed, is further based at least in part on one or more reviewer votes received for the translation that the particular reviewer reviewed.

12. The one or more non-transitory computer-readable storage media of claim 10, further comprising executable instructions that cause one or more computer systems to select the content instance in need of translation and provide the selected instance to a translator.

13. The one or more non-transitory computer-readable storage media of claim 10, wherein the content instance is associated with an item offered for consumption and wherein providing the selected particular translation includes providing the selected particular translation in connection with offering the item for consumption.

14. A computer system for providing content, comprising:
one or more processors; and
memory including instructions collectively executable by the one or more processors that cause the computer system to:
receive, from a translator, a translation of a content instance, the translator having a translator score, the translator score being based at least in part on particular translation scores for particular translations submitted by the translator and reviewer scores associated with one or more reviewers of the received translation;
provide the received translation to the one or more reviewers;
receive one or more votes from a set of the one or more reviewers;
calculate, based at least in part on the received one or more votes and the translator score, a translation score for the translation of a content instance;
determine, based at least in part on the calculated translation score, whether to provide the translation of the content instance; and
when determined to provide the translation of the content instance, in response to a user request corresponding to the content instance, provide the translation of the content instance for presentation to a user.

15. The computer system of claim 14, wherein the memory includes instructions that cause the computer system to receive a third-party request for translation of the content instance and wherein providing the translation of the content instance includes providing the translation to the third-party.

16. The computer system of claim 14, further comprising a data store having stored therein previously received translations with corresponding original content instances and with corresponding translation scores that exceed a threshold, and wherein the instructions further cause the computer system to detect if the corresponding translation scores exceeds the threshold and, when the corresponding translation scores exceed the threshold, store the previously received translation in the data store.

17. The computer system of claim 16, wherein the instructions further cause the computer system to receive a request for translation of a second content instance, to parse the second content instance into a plurality of tokens, to determine whether any of the plurality of tokens are in the data store, and to translate at least a portion of the second content instance based at least in part on the plurality of tokens of the second content instance in the data store.

18. A computer-implemented method for providing translated content, comprising:
providing, by one or more processors, to a first user a content instance in connection with an offer for consumption of an item in an electronic marketplace;
receiving a translation of a content instance from the first user, the first user having a translator score, the translator score being based at least in part on particular translation scores for particular translations submitted by the first user and reviewer scores associated with one or more reviewers of the received translation;
providing the received translation to the one or more reviewers;
receiving one or more votes from a set of the one or more reviewers;
calculating, based at least in part on the received one or more votes and the translator score, a translation score for the translation; and
when the translation score satisfies one or more criteria, providing to a second user the translation of the content instance in connection with another offer for consumption of the item.

19. The computer implemented method of claim 18, further comprising determining that content should be provided to the second user and wherein providing to the second user the translation of the content instance includes providing the translation of the content instance in connection with said another offer for consumption of the item in the electronic marketplace.

20. The computer implemented method of claim 18, wherein providing the translation of the content instance in connection with said another offer for consumption of the item includes providing said another offer for consumption in another electronic marketplace.

21. The computer implemented method of claim 18, further comprising receiving a different translation of the content instance from a third user.

22. The computer implemented method of claim 18, further comprising:
providing content to a set of users that includes the first user;
selecting, based at least in part on the one or more criteria, a subset of the set of users to whom to provide an option to submit content instance translations, the subset including the first user; and
providing the option to submit the content instance translation.

23. The computer implemented method of claim 18, further comprising calculating a reviewer score for a particular reviewer of the one or more reviewers based at least in part on agreement of the particular reviewer with one or more other reviewers, and wherein calculating the translation score for a translation reviewed by the particular reviewer is based at least in part on the particular reviewer score.

24. The computer-implemented method of claim 18, wherein a reviewer of the at least one reviewer of one or more reviewers, having a reviewer score above a threshold, impacts the translator score more heavily than a reviewer of the at least one reviewer of the one or more reviewers having reviewer scores below the threshold.

\* \* \* \* \*